(12) United States Patent
Vogelsang et al.

(10) Patent No.: US 6,223,718 B1
(45) Date of Patent: May 1, 2001

(54) DRIVE UNIT WITH AN ENGINE AND A RETARDER

(75) Inventors: Klaus Vogelsang; Peter Heilinger; Jürgen Friedrich; Karl Mondorf, all of Crailsheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 08/842,262

(22) Filed: Apr. 24, 1997

(30) Foreign Application Priority Data

Apr. 25, 1996 (DE) ................................. 196 16 427

(51) Int. Cl.$^7$ ..................................... F02D 39/02
(52) U.S. Cl. .............................................. 123/320
(58) Field of Search ................. 123/41.13, 320, 123/319, 142.5 R; 188/292, 296

(56) References Cited

U.S. PATENT DOCUMENTS

| | | | |
|---|---|---|---|
| 2,750,009 | 6/1956 | Pohl | 188/90 |
| 3,051,273 | 8/1962 | Cordiano et al. | 188/90 |
| 3,650,358 | 3/1972 | Bessiere | 188/296 |
| 3,720,372 | 3/1973 | Jacobs | 237/12.3 |
| 3,860,097 | 1/1975 | Braschler et al. | 188/296 |
| 3,919,844 | 11/1975 | Elderton | 60/330 |
| 4,169,414 | 10/1979 | Muller | 105/61 |
| 4,175,647 | 11/1979 | Hanke | 188/274 |
| 4,200,002 | 4/1980 | Takahashi | 74/530 |
| 4,411,340 | 10/1983 | Brosius et al. | 188/296 |
| 4,458,792 | 7/1984 | Thomas et al. | 188/296 |
| 4,474,270 | 10/1984 | Vogelsang | 188/296 |
| 4,538,553 | 9/1985 | Kurz et al. | 123/41.13 |

(List continued on next page.)

FOREIGN PATENT DOCUMENTS

| | | | |
|---|---|---|---|
| 1 946 167 | 5/1970 | (DE) | 123/320 |
| 2 150 115 | 4/1973 | (DE) | 123/320 |
| 2462058 | * 4/1976 | (DE) | 123/320 |
| 33 01 560 | 4/1984 | (DE) | 123/320 |
| 37 13 580 | 11/1988 | (DE) | 123/320 |
| 44 08 349 | 10/1994 | (DE) | 123/320 |
| 0 707 140 | 4/1996 | (EP) | 123/320 |
| 2 383 053 | 10/1978 | (FR) | 123/320 |
| 1007421 | 10/1965 | (GB) | 123/320 |
| 1 464 372 | 2/1977 | (GB) | 123/320 |

OTHER PUBLICATIONS

European Search Report of counterpart European Application 97 10 4907.7, Applicant: Voith Turbo GmbH & Co. KG.
Abstract of German Publication No. 2 150 115 obtained from Derwent World Patent Index.
Abstract of French Publication No. 2 383 053 obtained from Derwent World Patent Index.
Abstract of European Publication No. 0 707 140 obtained from Derwent World Patent Index.
Abstract of German Publication No. 37 13 580 obtained from Derwent World Patent Index.
European Search Report of counterpart European Application No. 96 10 6593.5, Applicant, Voith Turbo GmbH.

*Primary Examiner*—Raymond A. Nelli
(74) *Attorney, Agent, or Firm*—Marshall, O'Toole, Gerstein, Murray & Borun

(57) ABSTRACT

A drive unit includes a hydrodynamic retarder having a rotor paddle wheel, a stator paddle wheel, and a housing surrounding the rotor and stator wheels. The unit includes a coolant cycle system for an internal combustion engine, the coolant for this coolant cycle also being a working medium of the retarder. The drive unit further includes a working medium container for the coolant which is connected to the coolant cycle system. A connecting pipe is disposed between the working medium container and a hydrodynamic center of the retarder. A valve is disposed in the connecting pipe.

3 Claims, 1 Drawing Sheet

U.S. PATENT DOCUMENTS

| | | | |
|---|---|---|---|
| 4,744,443 | 5/1988 | Brosius | 188/292 |
| 4,773,513 | 9/1988 | Herrmann et al. | 188/276 |
| 4,836,341 | 6/1989 | Hall, III | 188/290 |
| 4,908,905 | 3/1990 | Kanno et al. | 16/82 |
| 4,922,872 * | 5/1990 | Nogami et al. | 123/319 |
| 5,193,654 | 3/1993 | Vogelsang | 188/296 |
| 5,251,588 * | 10/1993 | Tsujii et al. | 123/142.5 R |
| 5,255,733 * | 10/1993 | King | 123/142.5 R |
| 5,333,707 | 8/1994 | Kaneda | 188/296 |

* cited by examiner

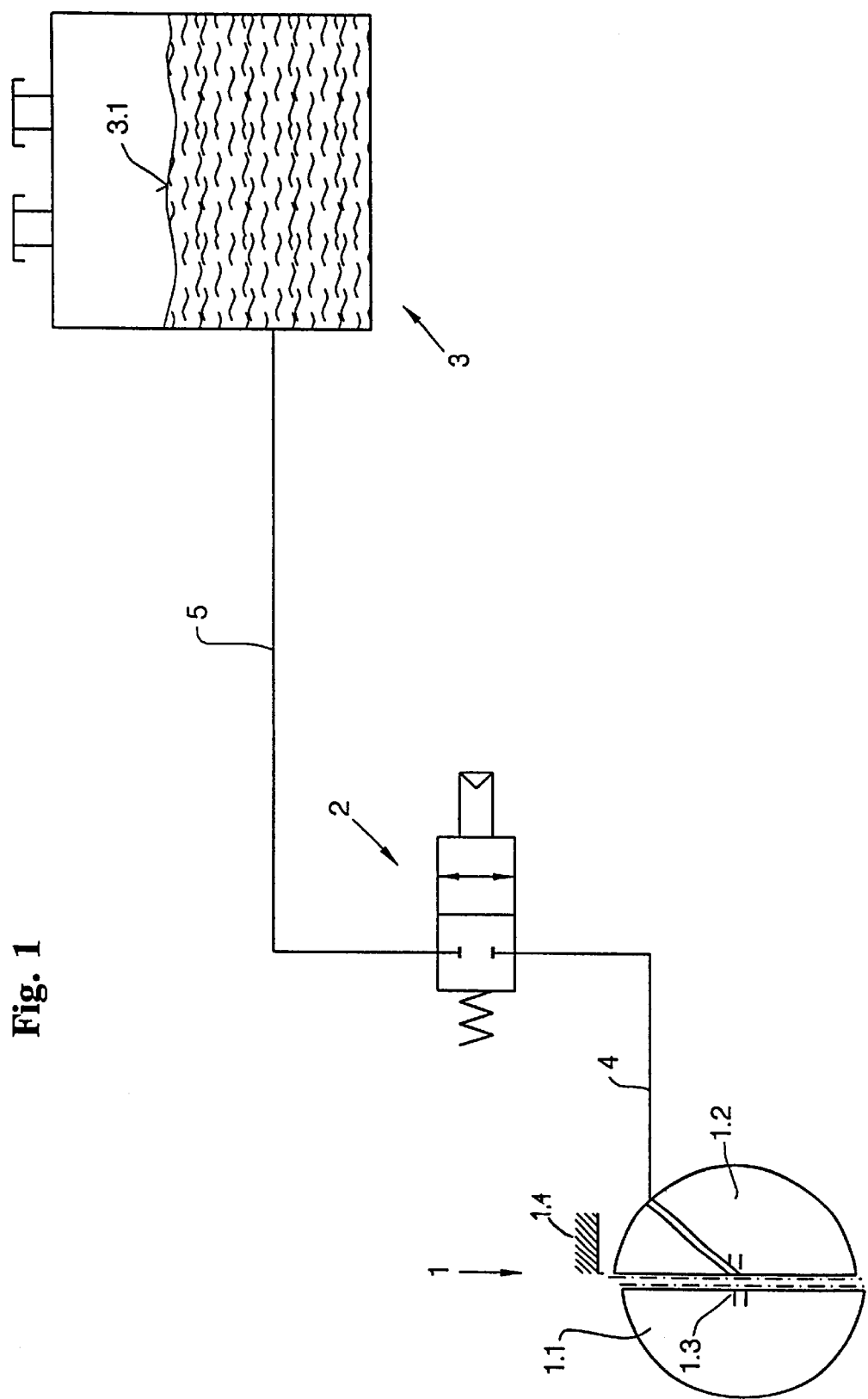

DRIVE UNIT WITH AN ENGINE AND A RETARDER

BACKGROUND OF THE INVENTION

1. Field of the Invention

The invention relates to drive units and in particular to such units having an engine, a retarder and a pump.

2. Description of Related Technology

Drive units having an engine, a retarder and a pump are known in the art. For example, such a drive unit is disclosed in DE 37 13 580 which discloses a retarder for circulating the coolant of a vehicle cooling unit which is disposed in the coolant circulation, both in normal traction operation as well as during retarder operation (i.e., a "water-pump retarder"). The retarder disclosed in DE 37 13 580 is controlled by a suitable valve arrangement in such a way that in case of need, the retarder also can perform braking work. During the "pumping" operation, the power uptake should be as low as possible, while the power uptake should be as high as possible during the retarder "braking" operation. The technical requirements are thus very contradictory. As a result, the "pumping" operation does not operate effectively enough as too much power is taken up (i.e., absorbed).

On the other hand, if the two functions of "pumping" and "braking" are separated structurally, by providing a separate pump in addition to a retarder, then, although the retarder and the pump can be designed in such a way that the functions will be fulfilled optimally, such a system has a high space requirement. This is disadvantageous because the space in vehicles is very limited, especially at the particular location where the pump and the retarder would need to be placed.

For the sake of completeness, the following publications also are disclosed herein:

The retarder disclosed in U.S. Pat. No. 3,720,372 is integrated with the driving engine, permanently attached to the crankshaft, and coolant of the cooling unit continuously flows through the retarder. The rotor of the retarder serves as a circulating pump instead of a special coolant pump. The purpose of this arrangement is to heat the coolant by the retarder in order to heat the passenger compartment. A control system disposed on the retarder serves the purpose of passing or distributing the coolant as a function of its temperature in a bypass line through the radiator.

A retarder also is disclosed in DE 33 01 560 (corresponds to U.S. Pat. No. 4,538,553) which is connected through a switchable coupling to the crankshaft of a driving engine and to the driving wheels of a vehicle. However, the task of the retarder is not the uptake and conversion of the high kinetic braking energy of the vehicle into heat. The retarder is operated exclusively as a heater, whereby the heating output is controlled with consideration of the available drive power. The coolant of the engine also is the operating fluid of the retarder.

A retarder disclosed in DE-AS 1 946 167 (corresponds to U.S. Pat. No. 3,650,358) is connected directly to the crankshaft of an internal combustion engine, the coolant of which also serves as an operating fluid for the retarder. An advantage of this mode of operation is that the heat produced evolves directly in the coolant introduced to the radiator and the heat exchanger between two fluids can be omitted.

EP 707 140 discloses a drive unit with an engine and a hydrodynamic retarder. In order to transport the coolant, a pump impeller is provided which is disposed axially to the rotor paddle wheel of the retarder.

In the retarders known in the art, a certain power loss occurs during non-braking operation. Namely, during non-braking operation, the retarder is filled with air in addition to a residue of the working medium of the retarder. This leads to ventilation losses.

SUMMARY OF THE INVENTION

It is an object of the invention to overcome one or more of the problems described above. It also is an object of the invention to provide a drive unit of the type described above in which ventilation losses are minimized and wherein the retarder operates optimally in the braking operation, that is, the braking behavior is constant and reproducible.

A drive unit according to the invention includes a hydrodynamic retarder having a rotor paddle wheel, a stator paddle wheel, and a housing surrounding the rotor and stator wheels. The unit includes a coolant cycle system for an internal combustion engine, the coolant for this coolant cycle also being a working medium of the retarder. The drive unit further includes a working medium container for the coolant which is connected to the coolant cycle system. A connecting pipe is disposed between the working medium container and a hydrodynamic center of the retarder. A valve is disposed in the connecting pipe.

Other objects and advantages of the invention will be apparent to those skilled in the art from the following detailed description taken in conjunction with the drawing and the appended claims.

BRIEF DESCRIPTION OF THE DRAWINGS

FIG. 1 is a schematic view of a drive unit according to the invention.

DETAILED DESCRIPTION OF THE INVENTION

In a drive unit according to the invention, a valve is disposed in a connecting pipe which flow connects a hydrodynamic center of a retarder to a container which holds the coolant for an internal combustion engine. This coolant also is the working medium of the retarder. The valve is closed during non-braking operation. Since the connecting pipe between the operating material (coolant) container and the retarder opens in the hydrodynamic center of the retarder, where a reduced pressure exists, the section of the connecting pipe between the valve and the hydrodynamic center is evacuated. Thus, the residue of working medium in the hydrodynamic center and in the entire retarder working chamber is minimized. Therefore, the power uptake during non-braking operation is minimized.

During the braking operation, the valve in the connecting pipe is opened. As a result of creating a conducting connection between the working medium container and the hydrodynamic center of the retarder, the retarder can be filled immediately and very rapidly with the necessary amount of working medium, so that the braking action can occur rapidly.

The invention is explained in more detail with the aid of FIG. 1 which is a schematic representation of an embodiment of a drive unit/braking system according to the invention. The drive unit/braking system includes a hydrodynamic retarder 1, a valve 2 and a working medium container 3 shown filled with a working medium up to a level 3.1. The retarder 1 has a rotor paddle wheel 1.1 and a stator paddle wheel 1.2. The two wheels form a working chamber together, which has a hydrodynamic center 1.3. The wheels are surrounded and supported by a housing 1.4, shown schematically.

The three drive unit aggregates 1, 2, and 3, are connected to each other with pipes. A pipe 4 is between the retarder 1 and the valve 2. A pipe 5 is between the valve 2 and the working medium container 3. The Pipe 4 leads to the hydrodynamic center 1.3 of the retarder 1.

In the embodiment shown in FIG. 1, the pipe 4 is passed through the stator paddle wheel 1.2. It also is possible to create a connection from the container 3 to the center 1.3 of the retarder 1 through a circulation gap between the rotor paddle wheel 1.1 and the stator paddle wheel 1.2. A connection through the retarder paddle wheel 1.1 also would be possible.

In the embodiment shown in FIG. 1, the valve 2 may be a 2/2-way valve which can be activated (i.e., switched) by the pressure (hydraulic) present in the drive unit system. Also in the embodiment shown in FIG. 1, the pipe 5 opens at a location under the surface level 3.1 of the working medium in the container 3.

In order to keep the power loss low during the so-called pumping operation of the retarder 1 (i.e., during the pauses in braking), the residual amount of fluid present in the working chamber of the retarder 1 must be minimized. According to the invention, this is achieved by closing the conducting connection between the working medium container 3 and the hydrodynamic center 1.3 of the retarder 1. This is done by setting a corresponding position of the valve 2. The rotor paddle wheel 1.1 continues to turn even during the pumping operation. As a result, the working medium is transported out from the working chamber of the retarder 1. Due to the position of the valve 2, no further working medium can flow into the retarder 1. Therefore, a reduced pressure is created in the working chamber of the retarder 1 so that a reduced amount of air is present in the working chamber of the retarder 1. Therefore, ventilation losses are minimized.

For the braking operation, the valve 2 is brought into such a position that a conducting connection between the retarder 1 and the working medium container 3 is restored and thus the potential is equalized. As a result, a reproducible and optimally controllable braking momentum is produced in each braking phase of the retarder 1.

The foregoing detailed description is given for clearness of understanding only, and no unnecessary limitations should be understood therefrom, as modifications within the scope of the invention will be apparent to those skilled in the art.

We claim:

1. A drive unit comprising:
   a) a hydrodynamic retarder having a hydrodynamic center, a rotor paddle wheel, a stator paddle wheel, and a housing surrounding said wheels;
   b) a coolant cycle system through which a coolant flows for an internal combustion engine, the coolant also being a working medium of the retarder;
   c) a working medium container connected to the coolant cycle system;
   d) a connecting pipe disposed between the working medium container and the hydrodynamic center of the retarder; and
   e) a valve disposed in the connecting pipe.

2. The drive unit of claim 1 wherein the valve is a 2/2-way valve.

3. The drive unit of claim 1 wherein the valve is activated with the hydraulic pressure present in the system.

* * * * *